INVENTOR
JULES-ODON DE SENEPART
BY Irwin L Thompson
ATTY.

United States Patent Office 3,422,822
Patented Jan. 21, 1969

3,422,822
CIGARETTE FILTER
Jules-Odon de Sénépart, Lausanne, Switzerland, assignor to Adrien Schnyder, Bienne, Switzerland
Continuation of abandoned application Ser. No. 260,207, Feb. 21, 1963. This application Jan. 4, 1966, Ser. No. 525,796
Claims priority, application Switzerland, Feb. 27, 1962, 2,459/62
U.S. Cl. 131—269         1 Claim
Int. Cl. A24f 7/04; A24f 13/06

ABSTRACT OF THE DISCLOSURE

A tobacco smoke filter comprises an elongated cylindrical mass of foamed synthetic resin. The central portion of the foam filter is constituted by relatively large intercommunicating cells and the periphery is constituted by relatively small partially or totally closed cells constituting a smoke-blocking annulus. The specific weight of the filter is greater at its periphery than at its center.

---

This application is a continuation of my application Ser. No. 260,207, filed Feb. 21, 1963, now abandoned.

The present invention relates to cigarette filters designed to eliminate at least a portion of impurities from the smoke.

In cigarette filters known to the art, it has been proposed to provide as a filter material a plastic foam with interconnecting cells. However, such filters have been ineffective to remove a substantial proportion of the impurities from the smoke.

It has now been discovered that a cigarette filter in the form of an elongated cylindrical plug which is characterized by a mass of interconnected cavities can be highly effective if at least 40% of the transverse cross section of the cylindrical plug is impervious to smoke, over substantially the entire length of the plug. As a result of this construction, the smoke is so accelerated, when passing through the relatively small openings that interconnect the cells or cavities, that highly turbulent flow results; and this in turn causes the microparticles of impurity suspended in the smoke to collide so violently that they agglomerate into macroparticles. These macroparticles, by virtue of their size and weight and surface characteristics, are easily captured and held on the walls of the cavities, so that a large proportion of the impurities previously in the smoke are removed and retained in the filter.

In retrospect, therefore, it appears that in the cigarette filters of the prior art, in which the mass of interconnected cells was of the same diameter as the cigarette, the smoke was evidently passing through the filter at the same speed as through the tobacco, with the result that the smoke was not accelerated sufficiently to cause the agglomeration or formation of macroparticles referred to above.

It has also been proposed, in the prior art, to provide a constriction adjacent the filter; and such a constriction of course would cause the smoke to pass much more rapidly through the constriction than through the body of tobacco of the cigarette. However, the increased velocity of smoke passing through the constriction occurred only in the plane of the constriction, and upstream and downstream of the constriction the smoke was not accelerated. Thus, in the light of the present invention, it appears in retrospect that such constrictions did not provide an appreciable length of high speed smoke passage, with the result that the smoke was accelerated only instantaneously and agglomeration of the impurities into macroparticles did not take place.

Cigarette smoke is an aerosol maintained in suspension in a gaseous phase constituted by air and complete or incomplete combustion products such as carbon dioxide, carbon oxide, water vapor and others.

The chemical components of the aerosol come from the incomplete combustion of the tobacco and are formed of a great number of products such as tar, nicotine, resins, bases, etc., which are present in the state of a heterogeneous mixture either in solid phase or in liquid phase, in the form of microparticles or microvesicles of very small dimensions and which do not obey to the ordinary laws of gravity.

In an ordinary filtering tip the smoke passes through a relatively great void through which it flows at a moderate speed and in laminar conditions, each corpuscle which is carried by it keeps practically its independence so that the very great majority of these corpuscles crosses the filtering mass without having had the occasion to enter in collision between themselves or with an obstacle.

On the contrary, if the smoke current is brought to strongly turbulent flowing conditions the microparticles undergo a very violent stirring the result of which is to provoke a series of shocks between the microparticles which agglomerate under the effects of these shocks and determine a very great enlargement of the average diameter of the particles which, one can say, pass from the aerosol state to a heavy fog state. In order to obtain a highly turbulent flowing condition the speed of the smoke current and the structure of the medium which has to be crossed are determinent factors.

When smoking a cigarette the duration of one aspiration and the volume of the sucked smoke during this time are in an approximately constant ratio. For same volume of smoke flowing during a given period of time, the speed of flow through a filter is necessarily the greater the less space is provided in the filter for the passage of the current. One obtains consequently a greater or lesser acceleration of the current during its crossing of the filter in reducing more or less the over-all usable space for this transit, in other words by obturating a part of the filtering plug. Therefore, the filter is divided in two zones one of which is impervious and the other of which is readily permeable. To force the smoke to go exclusively through the voids of a thus reduced permeable zone does not diminish the porosity of a filter, no more for example than the use of a cigarette-holder renders the sucking action more difficult.

The relation between the flowing conditions of the smoke current and the profile of the medium which it crosses requires a predetermined structure of the permeable zone. This comprises preferably a multitude of little more or less regular cavities, communicating through narrow necks so that the paths thus formed in this permeable zone are tortuous and presents a random succession of narrowings and enlargements. Such a structure acquires here its full value due to its interference with a strongly accelerated current on the whole length of the filter. It has notably the effect of causing a turbulent flow in each of the subdivisions of the smoke current thereby to provoke shocks between the microparticles of the aerosol and thus the formation of macroparticles and simultaneously or cumulatively to subject each of these subdivided turbulent currents to repeated contractions and expansions realized on an infinitesimal scale which accomplishes to the maximum possible all the desired surface phenomena such as sedimentation, adsorption, condensation and others.

The interaction of these different phenomena is however complex and during their occurrence the water vapor plays an important role. Due to the ambient temperature and to the dynamics of the repeated expansions of each of the divided and accelerated currents, the adsorbing walls of the filtering material promptly saturate and after a short time the aqueous phase becomes preponderent with the result that the shocks of the colloidal particles and other particles against the walls result in an accumulation of the incident products. These incident products may be either solutions or pure condensed water, or water insoluble particles or corpuscles partially or wholly coated with water and having served as condensation nuclei in a saturated atmosphere.

One important advantage of the invention is to enable an easy elimination of a great part of the harmful substances of the smoke. The invention enables not only to elaborate easily several variants of a filtering complex able to retain more than 50% of the toxic products, contained in the tobacco smoke but also to control empirically with precision the desired retention rate.

The filter according to the present invention offers further the great advantage of being able to be manufactured in different embodiments by means of materials such as are on the market, that is to say, materials which do not need to undergo before or during the manufacture of the filter any special mechanical, chemical, thermical or other treatment, contrary to what happens during the manufacture of most of the filters in use.

Another considerable advantage of the filter according to the invention is that this new filter may be manufactured according to any of the now used methods and without necessitating any modification of the now used machines. However, the invention may also be made by other means.

The attached drawings show schematically and by way of non limitative examples different embodiments of the filter and variants thereof.

Figure 1:
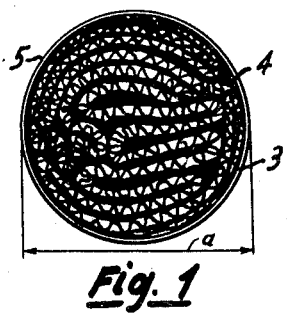
FIG. 1 is a transverse cross-section of a first embodiment of the filter made out of a compound strip constituted by superimposed layers of materials of different compactness.
Figure 2:
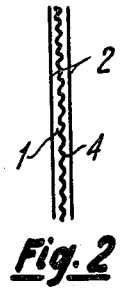
FIG. 2 is a view in longitudinal cross-section of a section of a compound strip according to a first variant.
Figure 3:
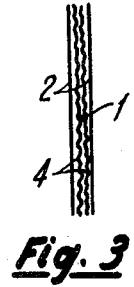
FIG. 3 is a view in longitudinal cross-section of a piece of a compound strip according to a second variant.

The filter shown in FIG. 1 presents permeable zones 4 and impervious zones 3. This filter is made of a compound strip such as one of those illustrated for example in FIGS. 2 and 3 and which comprise a layer of readily permeable material formed by one or more elemental sheets 4 inserted in fashion between layers 2 of a compact or impervious material, each formed by an elemental sheet. The readily permeable layer 1 is made of a material the texture of which comprises or allows the formation of numerous more or less regular cavities able to communicate between them and giving thus rise to tortuous paths presenting a random succession of narrowings and widenings. This porous layer 1 is formed for example by a cellular plastic sheet material or any other sheet material having the mentioned characteristics. The outside layers 2 are of any natural or synthetic material, fibrous or not, such for example as paper of the kind of tissue paper but non glazed or paper the faces of which present, from manufacturing, certain roughnesses but which must not be confused with the crepe paper generally used for ordinary filters. In practice any sheeted material perfectly neutral wtih respect to the combustion and inhalation operations may be used provided that it be relatively rough, easy to fold, easy to cut off and which is not pervious to the smoke. The width of this compound strip is determined as a function of the thickness of the elementary sheet of which the strip is made and of the diameter $a$ of the filter to be manufactured.

The manufacturing of the filter from this compound strip is effectuated according to the industrial method referred to as the longitudinal one and according to known techniques. The strip is unrolled from a spool and engaged in a machine where it is folded on itself, compressed and mechanically wrapped in a sleeve of paper 5 so as to be transformed into a continuous rope having the desired dimensions round or oval. This rope is further cut in sections of predetermined length.

In the described construction, the permeable zone 4 and the compact zone 3 interpenetrate by accident due to the folding and to the shrinkage so that a transverse cross-section of the filter (FIG. 1) shows a tangling of windings the ones formed by the permeable layer, the others by the impervious layer, these tangled component layers respecting a continuous arrangement along the whole length of the manufactured filter.

Inside the permeable zone 4 the velocity of the smoke current is determined by the section of the free space which the current has for its passage and by the general construction of the filtering mass which it traverses. Because of the described structure, the current crossing the permeable zone 4 is thus divided into a multiplicity of partial currents which are each individually accelerated and brought to really turbulent conditions. The ambient temperature being near the dew-point, the condensated water vapor wets the walls of the filtering material. The cavities which direct the passage of each partial current constitute as much expansion bags on the inner walls of which the vesiculated macroparticles generated by the turbulence are brutally projected and will collect.

Figure 4:
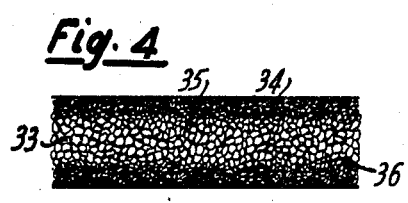
FIG. 4 is a view in cross-section of a further embodiment of the filter made directly by moulding a multi-cellular plastic material.
Figure 5:
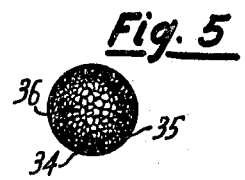
FIG. 5 is a view in transverse cross-section of the filter of FIG. 4.

According to FIGS. 4 and 5, respectively rope 33 of expanded synthetic resin is directly formed by moulding out of a primitive plastisol. One knows that thanks to this operation the moulded rope is naturally coated with a non-porous and relatively rigid peripheral wall 34 which renders unnecessary any subsequent wrapping. But further in the transverse direction of the foam cylinder, the dimension and the porosity of the cells decrease radially from the center towards the periphery so that the zone adjacent to the wall is formed of very small cells which are partially or totally closed whereas the cells which form the nucleus of the rope have reached their normal expansion and are open that is to say communicating. A filtering plug constituted by a section of rope of cellular resin thus moulded comprises consequently a sensibly tubular obturated part 35 housing a foamy approximately cylindrical nucleus 36 which is readily permeable to the smoke the specific weight of which increases progressively towards the periphery whereas the specific weight of the obturated material part diminishes progressively towards the axis. Such a structure suits perfectly the operation of the invention. The respective importance of the component parts is adjusted as a function of the nature and of the proportion of the base products used in the preparation of the multi-cellular resin. For the moulding of relatively long or continuous elements which may be formed of a melted resin or of a pulverulent mixture the expanded cellular composition may be sustained through a support such as for example an axial fibrous wire.

Figure 6:
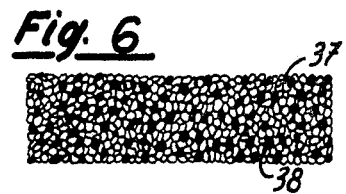
FIG. 6 is a view in longitudinal cross-section of a still further embodiment of the filter.
Figure 7:
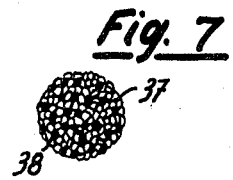
FIG. 7 is a transverse cross-section view of the filter of FIG. 6.

According to FIGS. 6 and 7, respectively, the filtering foam complex is constituted by an amalgam of communicating relatively uniform cells 37 and of closed elements 38 hollow or full and of sensibly constant dimension. Such a foam material is prepared by adding to plastisol a tensio-active material to obtain a multi-cellular composition containing a predetermined proportion of closed cells regularly distributed. The multi-cellular resins may also be loaded in any other suitable manner. The material used as load will be selected for non-toxicity, colour, the section, etc., and be light enough so as not to increase too much the specific weight of the obtained products.

It is clear that in the spirit of this invention the purely physical and well defined function which is given to the incorporated load in the cellular composition is to limit the space given to the passage of the smoke current in order to create in this current turbulent flowing conditions and if it happens that this operation, thanks to the properties of the loading product used, reinforces the filtering material or gives it a particular absorption, adsorption, oxidation or other power with regard to the undesirable substances, this subsidiary result is welcome but casual and not intended. The adding of an active load to a spongey natural or artificial body does not present an appreciable advantage. Further it has been experimentally proven that the retention power of a filter which does not present the specific character of the present invention and formed by an expanded resin selected by reason of its qualities in the polyester-isocyanate class is lower than that of the crepe paper filters commonly used. It has also been demonstrated that by charging the constitutive foam of the filter with intercepting elements acting physically or chemically one does not attain a retention rate higher than that of the other commercialized filters such as notably the filter constituted in part of cotton wadding and in part of ordinary crepe paper. On the other hand experience has also shown that by increasing the dose of the load or by compressing a profile of plastic foam in order to reduce it in the form of a filter, the porosity of the filtering body is rapidly compromised or suppressed. However, the foamed filter for cigarettes has not previously been feasible since for the aforesaid reasons and for several others it is not industrially workable under the forms which have been proposed until now. On the contrary, in the actual state of the art, the filter made of natural or synthetic cellular material of the present invention is capable of being used industrially without raising other problems.

Finally, among other embodiments of the invention are homogenous mixtures composed of permeable cellular pre-existing elements and non cellular compact elements. The cohesion of the filtering mass formed of this mixture may be reinforced by means of a binding agent. The fabrication of such a filter in continuous rope involves the same techniques as the manufacture of the cigarette itself. The porous component of the mixture may be formed for example of spongey fine jagged bodies of plastic foam scrap. Among the products to constitute the compact component, one may foresee: fragments of cellulosic materials, or of non-cellular synthetic resin, little chips or sawdust, cork granules, etc. The dosage of the mixture is effected as a function of the characteristics of the materials used and of the desired result, the essential object being always to reduce considerably but in proportion compatible with the sucking, the space available in the filtering bodies for the passage of the smoke current.

Having described my invention, I claim:

1. A tobacco smoke filter comprising a cylindrical mass of foamed synthetic resin, the central portion of said foam filter being constituted by relatively large intercommunicating cells and the periphery being constituted of relatively small partially or totally closed cells constituting a smoke-blocking annulus, the filter being so constructed as to manifest a specific weight which is greater at its periphery than at its center.

References Cited

UNITED STATES PATENTS

| | | | |
|---|---|---|---|
| 2,178,820 | 11/1939 | Todoroff | 131—10 X |
| 3,103,221 | 9/1963 | Harris | 131—10.7 X |
| 3,059,649 | 10/1962 | Bernhard | 131—10.5 |
| 2,064,239 | 12/1936 | Aivaz | 131—10 |
| 2,349,551 | 5/1944 | Helm | 131—10 X |
| 2,793,572 | 5/1957 | Parmele | 131—10 |
| 2,820,461 | 1/1958 | Muller | 131—10 |
| 2,949,116 | 8/1960 | Balkind | 131—10 |
| 3,059,649 | 10/1962 | Bernhard | 131—10 |

FOREIGN PATENTS

| | | |
|---|---|---|
| 121,414 | 5/1946 | Australia. |
| 380,041 | 9/1932 | Great Britain. |
| 755,075 | 8/1956 | Great Britain. |
| 908,185 | 10/1962 | Great Britain. |
| 30,668 | 8/1933 | Netherlands. |

MELVIN D. REIN, *Primary Examiner.*

U.S. Cl. X.R.

131—10.5